(12) United States Patent
Harrison

(10) Patent No.: US 6,797,165 B2
(45) Date of Patent: Sep. 28, 2004

(54) MODULAR MULTI-STAGE WATER FILTRATION SYSTEM

(76) Inventor: Dana Harrison, 356B E. Mountain Dr., Santa Barbara, CA (US) 93108

( * ) Notice: Subject to any disclaimer, the term of this patent is extended or adjusted under 35 U.S.C. 154(b) by 0 days.

(21) Appl. No.: 10/143,823

(22) Filed: May 14, 2002

(65) Prior Publication Data
US 2003/0213737 A1 Nov. 20, 2003

(51) Int. Cl.[7] .................. B01D 36/02; B01D 27/14; B01D 35/153; C02F 9/08; C02F 9/12
(52) U.S. Cl. .................. 210/232; 210/234; 210/235; 210/198.1; 210/202; 210/266; 210/257.1; 210/257.2; 210/323.2
(58) Field of Search .................. 210/232, 234, 210/235, 198.1, 202, 266, 257.1, 257.2, 323.2

(56) References Cited

U.S. PATENT DOCUMENTS

| | | | | |
|---|---|---|---|---|
| 3,945,923 A | * | 3/1976 | Rogers et al. | |
| 4,151,085 A | * | 4/1979 | Malik | |
| 4,271,020 A | * | 6/1981 | Van Meter | |
| 4,379,053 A | * | 4/1983 | Brane | |
| 4,623,467 A | * | 11/1986 | Hamlin | |
| 4,761,295 A | * | 8/1988 | Casey | |
| 4,784,763 A | * | 11/1988 | Hambleton et al. | |
| 5,082,557 A | * | 1/1992 | Grayson et al. | |
| 5,248,417 A | * | 9/1993 | Reid | |
| 5,714,066 A | * | 2/1998 | Jang | |
| 5,753,107 A | * | 5/1998 | Magnusson et al. | |

* cited by examiner

Primary Examiner—Thomas M. Lithgow
(74) Attorney, Agent, or Firm—Patton Boggs LLP

(57) ABSTRACT

A modular water filter system having a plurality of filter canister receptacles, each receptacle having a diverter valve for routing water into and out of the particular canister installed in the receptacle. The diverter valves are interconnected by water hoses such that water is sequentially filtered by flowing into the first diverter valve, through its installed filter canister, then to the second diverter valve and through its installed filter canister, and through the succeeding diverter valves and filter canisters to a final tap. The filter configuration, including filter type, filter quality, and filter sequence, is changed by simply installing different filter canisters into the diverter valves. An intermediate taps can be connected to the output of any diverter valve to provide the user with water filtered by that diverter valve's filter canister and all preceding filter canisters.

12 Claims, 4 Drawing Sheets

MODULAR MULTI-STAGE WATER FILTRATION SYSTEM

BACKGROUND OF THE INVENTION

1. Field of the Invention

This invention relates generally to water filtration systems and, more particularly, to a modular multi-stage filtration apparatus for selectable filtering modes and scalable capacity.

2. Statement of the Problem

Most households and businesses that receive water from a municipal water supply or other public waterworks depend totally on the waterworks' filtration system for ensuring the purity of the water. For purposes of this description "purity" means acceptable, non-hazardous amounts of particulate matter, bacteria, minerals, organic and inorganic compounds and chemicals. There are shortcomings, however, in the filtration and purification systems used by many public waterworks. Many arise from the large water volume and the wide, complex distribution network that public waterworks must have to supply the water needs of users ranging into the millions. The large water volume limits the level and type of filtration that can be used. The distribution network frequently introduces new impurities downstream of the public waterworks filters. A related shortcoming is that the distribution network, by having such a large number of water passages extending over significant distances, is susceptible to influx of impurities and contaminants. Still another shortcoming, which is inherent in public waterworks, is that all of the water is filtered the same for all users.

Another issue relating to public waterworks, both their distribution network and their filtering and purification capabilities, is the increasing threat of biological or chemical agents being introduced into the water supplies, either for purposes of terrorism or simple random acts of malice. As a result, there is a need for a water purification and filtering system that can quickly incorporate state-of-the-art filtering features to reduce or eliminate new threats. It is estimated, however, that many public waterworks may not be able to meet these needs. One reason for this failure is the large volume of water that the public waterworks must deliver, which dictates correspondingly large filtration systems. Such large filtration systems are typically costly to modify or add additional stages to. A related issue is that the costs for some filtering modifications, in view of the scale, are rendered impractical. Further, public waterworks generally include a very large scale distribution network. In addition to creating an inherent susceptibility to introduction of impurities and contaminants, such a network significantly increases the susceptibility to chemical and biological agents being introduced downstream of their central filters.

Numerous types of water filtration systems, their component apparatus, and filtration methods employed within the apparatus are known in the art. Known water filtration systems include "point of use" water filters, which are installed local to a potable water outlet dedicated to a single user, or single apparatus or appliance. Examples include, but are not limited to, water faucets for a kitchen or bathroom sink, a shower or bathtub, a water fountain, and a clothes washing machine. Other known water filtration systems include "point-of-entry" water filters, which are located and installed to filter the water entering a house or business facility, prior to the water flowing into the distribution pipes typically providing water to the above-identified point of use outlets. The entry at which the "point of entry" filter is installed is typically fed by the municipal water supply or a well. The two types of filter systems typically have different capacity requirements, filtering performance, maintenance requirements, and cost, such that an apparatus or system optimized for one may not be optimal for the other.

Multiple stage filters are known in the art of water filtration, both for point of entry and point of use. A typical multiple stage point of use water filtration system includes multiple filter containers or cylinders receiving water from a diverter valve attached to a sink faucet, water supply line to the sink faucet, or to another plumbing connection dedicated to the point of use outlet. The diverter valve typically introduces the unfiltered water to the filter media inside the cylinders, from which it is eventually dispensed through a spigot. The filter cylinders are typically, but not necessarily, oriented vertically with respect to the earth. If the apparatus is visible and accessible, the spigot may be located on, for example, a housing of the apparatus. An example water filter having such a spigot is the kind located on a sink counter, which is commonly referenced as an "above-the-counter" model. The spigot may be separate from the filter apparatus, an example being a second faucet connected to an outlet port of the filter by a feed line, which is commonly referred to as an "under-the-counter" model.

A typical point of entry water filter is also multistage, employing multiple cylinders similar to those used within a point of use apparatus, sized for higher water flow rates and higher treatment capacities.

Regardless of its mounting location, a typical known or existing multistage water filtration apparatus includes an integrated set of filter containers or cylinders, or a fixed arrangement or sequence of filters. The type having an integrated set of filter containers has one or more predetermined configurations of filters, not changeable by the end user, and requires periodic replacement of the entire set, as a unit. The integrated filter set also does not have provision for controlling the sequence of filters that the water flows through, or means for the end user to select various sub-sets of the filters to obtain customized filtering.

An example of a filter having individual cylinders which are themselves replaceable is disclosed by U.S. Pat. No. 6,080,313, issued to Kelada. As seen from the example patent, the filter units, although individually replaceable, have a fixed configuration. The fixed configuration of this design limits its ability to optimally target the characteristics of a particular water source, and its ability to adapt to changes in water sources or source characteristics.

SUMMARY OF THE INVENTION

The present invention advances the art, including overcoming above-identified shortcomings in the prior art, and provides additional features and benefits, with a modular water filter system and method for filtering based on same.

A first example of an embodiment of this invention includes a bracket and a plurality of canister mount diverter valves, each mounted to the bracket. Each canister mount diverter valve has a receptacle, a valve intake port, a filter feed port, a filter output port, a valve output port, and a valve apparatus switchable between a first mode and a second mode. The first mode provides a filter feed passage from the valve intake port to the filter feed port and a filter flow receiving passage from the filter flow receiving port to the valve outlet port. The second mode provides a bypass water passage from the valve intake port to the valve outlet port, while cutting off the flow between the valve inlet port and the filter feed port and between the filter flow receiving port and the valve outlet port.

The example first embodiment further includes a plurality of canisters, each having a housing surrounding a contained volume. The housing has an engagement structure engaged with the receptacle of a corresponding one of the plurality of canister mount diverter valves. The contained volume of each canister includes a filter material, an inlet port opening at one end on an exterior surface of the housing and opening to the interior volume at another end, and an outlet port opening at one end on an exterior surface of the housing and opening to the interior volume at another end. The inlet port cooperates with the filter feed port of the corresponding one of said plurality of valve bodies to establish a water passage from the valve inlet port to the interior of the filter canister, and the outlet port cooperates with the filter flow receiving port of the one of the plurality of valves to form a water passage from the interior of the canister to the valve outlet port.

The example first embodiment further includes a first interconnect water passage extending from the valve output port of a first of the plurality of canister mount diverter valves to the valve input port of a second of the plurality of canister mount diverter valves. In addition, a final water passage extends from the valve output port of the second of the plurality of canister mount diverter valves to a final filtered water tap having an on-off valve.

The example first embodiment still further includes a first of the plurality of filter canisters engaged with the first of the plurality of valve bodies and a second of the plurality of filter canisters engaged with the second the plurality of valve bodies. In the example embodiment, at least two of the plurality of filter canisters have substantially identical engagement structures whereby each is interchangeable with the other with respect to engagement with at least two of said valve bodies.

A further example embodiment is in accordance with the above-summarized embodiment, further including an intermediate on-off tap connected at one end to an intermediate output spigot and connected at another end to a water tap-off between the valve outlet port of the one of the canister mount diverter valves and the inlet port of another of the canister mount diverter valves.

Another example embodiment of the invention is in accordance with any of the previously summarized embodiments, and further includes an ultraviolet sterilizing apparatus, having an input port and an output port, the input port connected through a water line to the exterior output port of any of the canister mount diverter valves.

Another aspect of the invention includes one of the filter modules having a second output port formed in its housing, the second output port having one end opening on an exterior of filter module's housing and having its other end opening to a waste output portion of the filter medium. This aspect further includes a water passage connecting the second output port to a external water drain.

A further aspect of this invention includes a reservoir storage tank having an input/output port connected to the input port of one of the canister mount diverter valves. The reservoir storage tank is connected to store a capacity of water when the on-off valve of the final filtered water output tap is closed and to output, at a predetermined pressure, the stored water into the input port of the canister mount diverter valve to which it is connected when the on-off valve of the final filtered water output tap is opened.

A further aspect of the invention forms at least one of the canister mount diverter valves having a diverter valve with a movable member and an actuator for acting on the movable member such that when the canister mount diverter valve is not engaged with a filter canister the actuator moves the movable member to open the bypass water passage from the valve input port to the valve outlet port, to block water from flowing between the valve inlet port and the filter feed port and from flowing between the valve outlet port and the filter flow receiving port.

Each of the above aspects of the invention provides a multi-stage modular water filtration system, adaptable to point-of-use or point-of-entry service, formed of a plurality of interchangeable filter canisters engaged within an interconnected plurality of canister mount diverter valves. Each filter canister contains a specific filter medium, selected for the user needs of the installed environment. The interchangeable feature of the filter canisters provides for an unlimited variety of filter configurations using the same plurality of canister mount diverter valves. This feature provides the capacity for performing a specific range of filtration functions, thereby allowing the user to select and configure a water filtration system that is directly targeted to filtration issues specific to a particular water source.

Moreover, the filter media in each filter canister can be upgraded or enhanced in composition, making individual filter canisters scalable to the treatment of higher concentrations of particular water contaminants. Still further, the aspect having at least one diverter valve provides multiple treatment grades of filtered water on demand, from a single source of water.

It is therefore a principal object of the invention to provide a modular multi-staged water filtration system, each module being a canister mount diverter valve with an engagement receptacle for filter canisters having a common outer engagement structure. The canisters can be replaced and rearranged without shutting off the water supply. One system can operate without all of the diverter valves having a filter canister installed, thereby allowing a common system design to be used for a variety of applications.

It is another principal object of the invention to form the engagement structure of the canister mount diverter valve and filter module engagement structure to have a twist-tap method of attachment. This renders each filter module easily attached to, removed from, or interchanged with another module, without interruption to the water flow though the apparatus.

C. BRIEF DESCRIPTION OF THE DRAWINGS

These and other objectives, features and advantages of the invention will become more apparent to, and better understood by, those skilled in the relevant art from the following more detailed description of the preferred embodiments of the invention taken with reference to the accompanying drawings, in which like features are identified by like reference numerals, and in which.

DETAILED DESCRIPTION OF THE PREFERRED EMBODIMENTS

Figure 1:
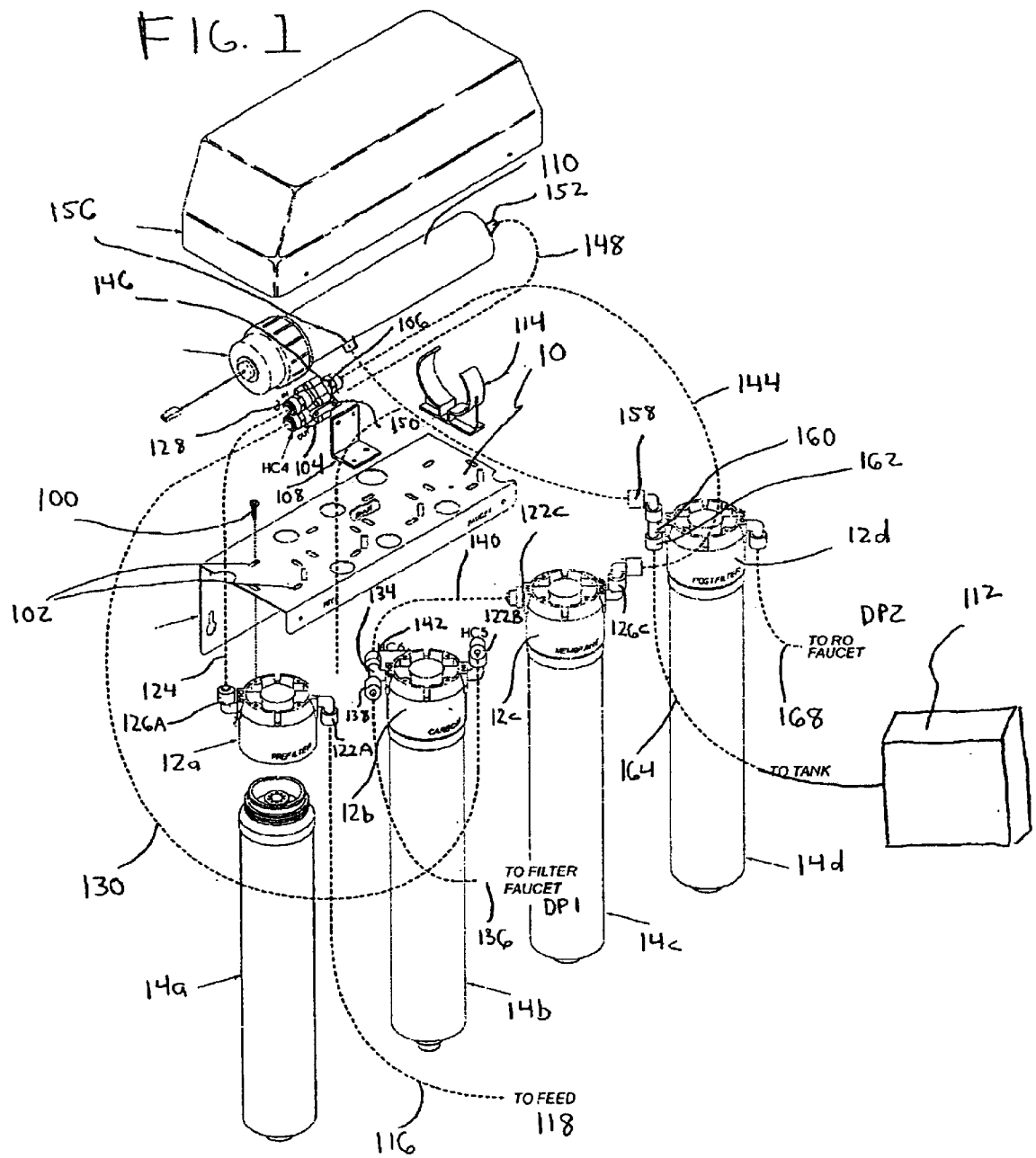
FIG. 1 shows an exploded view of an example modular water filter apparatus according to the present invention.

FIG. 1 depicts an exploded view of an example first embodiment of a filter system according to the present invention. The FIG. 1 example comprises a valve bracket 10, which supports four canister mount diverter valves, specifically labeled as 12a, 12b, 12c and 12d, and referenced generally as item 12. Each canister mount diverter valve 12 engages with and secures a filter canister 14. The canister mount diverter valves 12 are interconnected by hoses or water lines described further below such that water first flows through the particular filter canister 14a inserted into first canister mount 12a, and then in succession through whichever filter canisters 14b, 14c and 14d are inserted in the diverter valves 12b, 12c and 12d, and then out through the final water tap DP2.

The filter canisters 14 have an engagement structure, described in detail further below, allowing any canister 14 to be inserted into any canister mount diverter valve 12. This enables an almost unlimited variety of customized filter configurations. For example, in one configuration, the filter canister 14 engaged with the canister mount diverter valve 12a, labeled 14a for consistency, may contain a first type of prefilter to remove a particular class of contaminants. Using the same arrangement of canister mount diverter valves, a second configuration can be implemented simply by substituting a filter canister 14a having a second type of prefilter to remove a different class of contaminants. The same kind of substitution and reordering of the remaining filter canisters 14b through 14d can be carried out as well.

As will be described, the canister mount diverter valves 12 have a preferable structure such that when a filter canister 14 is removed the valve becomes a unobstructed water passage. This feature allows filter canisters 12 to be removed and replaced without shutting off the water supply, and without leaking substantial amounts of water on the installed premises. The feature also allows for continued supply of at least partially filtered water is a replacement for a defective or worn-out filter canister 14 is not immediately available.

Figure 2:
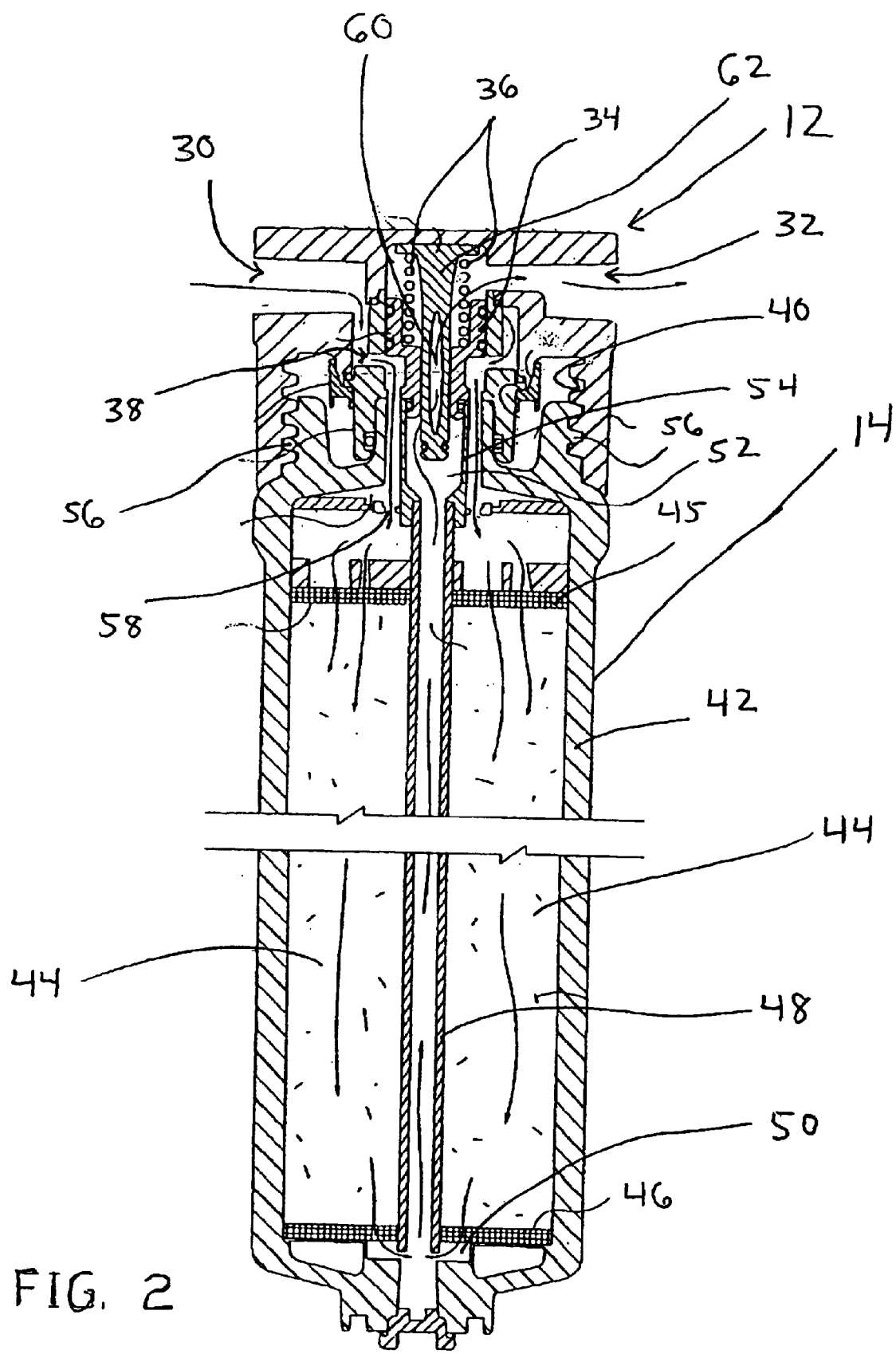
FIG. 2 shows a cross-sectional view of an example canister mount diverter valve engaged with an example filter canister, within a module of the FIG. 1 example apparatus.

FIG. 2 shows an example structure of a canister mount diverter valve 12 and a typical filter canister 14 engaged with same. The FIG. 2 example canister mount diverter valve 12 has two modes, referenced as the "canister-installed mode" and the "canister-removed mode", respectively. FIG. 2 depicts the "canister-installed mode."

The FIG. 2 example canister mount diverter valve 12 and filter canister 14 are in accordance with U.S. Pat. No. 5,591,332, which is hereby incorporated by reference. It is to be understood that the internal structure of the FIG. 2 example filter canister 14 is not a limitation because the internal structure of a particular filter canister 14 is according to the specific type of filter that the canister contains. However, the outer structure of each filter canister 14, to the extent it cooperates with the canister mount diverter vale 12, is preferably identical. The common engagement structure is pursuant to the objective this invention, which is a modular filter system in which any order and arrangement of filter canisters 14 can be selected and inserted into the system.

Referring to FIG. 2, the example canister mount diverter valve 12 has a valve intake port 30, a valve outflow port 32, a spring-biased valve member 34, a bias spring 36, at least one filter feed passage 38, and a threaded canister receptacle 40. The FIG. 2 example filter canister 14 has a housing 42 surrounding a filter material 44 which is secured in part by an upper filter screen 45 and a lower filter screen 46. A center tube 48 extends upward from a lower canister passage 50 to an upper canister passage 52. Attached to an upper end of the center tube 48 is a valve actuator 54. A threaded member 56 is concentric with the center tube 48. The center tube 48 and valve actuator 54 are dimensioned such that when the threaded member 56 is threaded into the threaded canister receptacle 40 the actuator 54 urges the spring-biased valve member 34 upward to the position shown in FIG. 2. In the FIG. 2 position the spring-biased valve member 34 opens the filter feed passages 38, thereby providing a flow passage from the valve intake port 30 into the filter canister receiving ports 58. Also, when the filter canister 14 is in the FIG. 2 engaged position, outflow from the filter center tube 48 is received through a passage 60 formed in the valve center support member 62 which extends into the valve outflow port 32.

Figure 3:
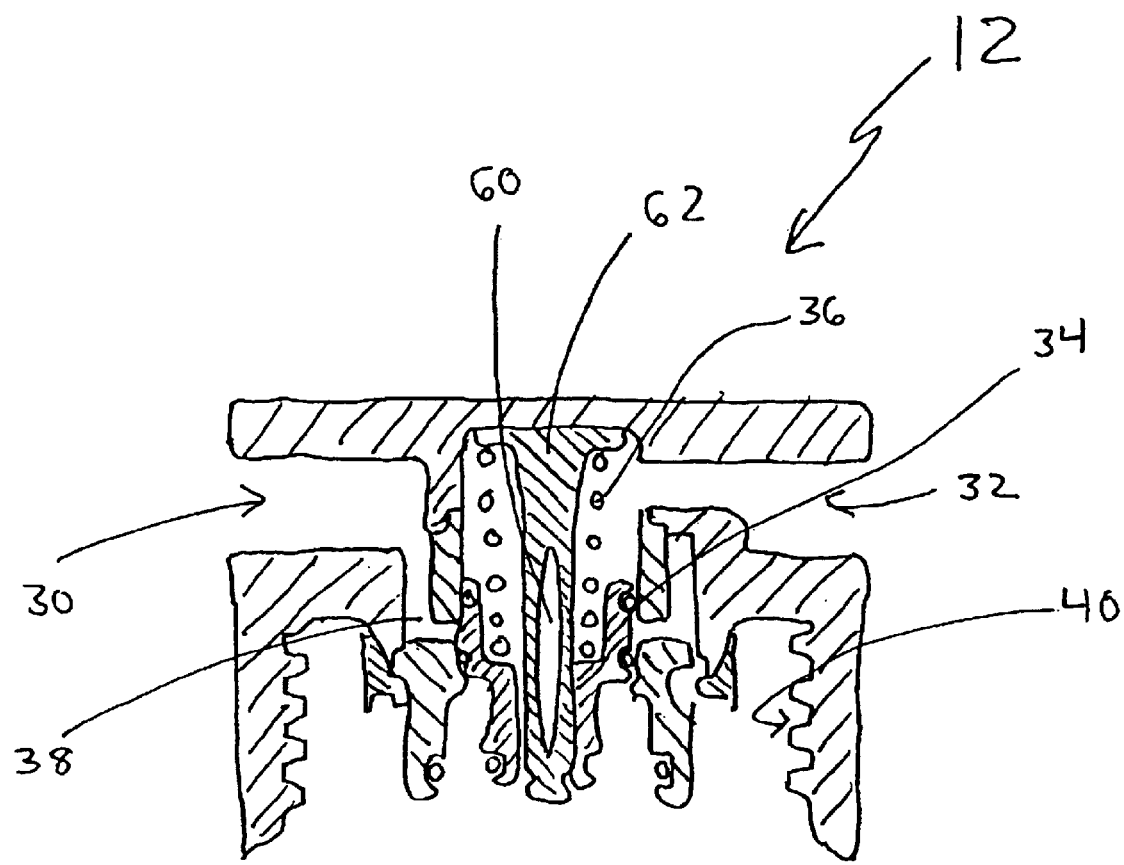
FIG. 3 shows the example canister mount diverter valve of FIG. 2 in the mode it assumes when the filter canister is removed.

FIG. 3 shows the example canister mount diverter valve 12 of FIG. 2 in the canister-removed mode, which it assumes when the filter canister 14 is removed. As shown, with the canister 14 removes the bias spring 36 urges the spring-biased valve member 34 to the depicted downward position. In the FIG. 3 position the valve member 34 blocks water from entering the filter feed passages 38 and diverts the water into a center chamber 64 in fluid communication with the valve outflow port 32. The FIG. 2 example canister mount diverter valve 12 thereby, in its FIG. 3 canister-removed mode, operates as a straight through water passage from the valve intake port 30 to the valve outflow port 32.

A benefit of a canister mount diverter valve 12 as described above is that canisters 12 can be quickly removed and/or replaced without shutting off or closing the main water feed, and without interrupting the water flow to the user.

Although it is preferable that the canister mount diverter valve 12 include a mechanism as shown in FIGS. 2 and 3 which automatically changes from the canister-removed mode to the canister-installed mode, and back, by the respective action of installing and removing the canister, this is not essential. Alternatively, a manually actuated, accessible, valve lever (not shown) could be used for changing between the two modes. Manually actuated water flow valves adaptable for this purpose are available from numerous vendors and, based on this disclosure, are readily selected by a persons having skill in the water distribution and filter arts.

Referring to FIG. 1, the first canister mount diverter valve 12a connects to the bracket 10 by, for this example, four mounting screws 100 which pass through clearance holes 102 formed in the bracket 10 and thread into threaded holes (not labeled) formed in the diverter valve 12a. Likewise, the canister mount diverter valves 12b, 12c and 12d are secured to the bracket 10 by way of a plurality, e.g., four, screws (not shown) which pass through respective clearance holes (not labeled) in the bracket 10, and thread into threaded holes (not labeled) formed in each of the diverter valves.

The FIG. 1 arrangement of four separate canister mount diverter valves 12 mounted via screws to the bracket 10 is for purposes of example only. Alternative embodiments include, but are not limited to, numbers of canister mount diverter valves 12 other than four, and a permanent attachment (not shown) of the canister mount diverter valves 12 to the bracket 10. Another alternative is a multiple-unit canister mount diverter valve (not shown) having, for example, two or more diverter valves with internal structure such as, for example, FIG. 2, but cast as a single unit.

An optional first water flow regulator 104 and an optional second water flow regulator 106, shown in the FIG. 3 example as formed as a single unit (not separately labeled) is attached to the main bracket via the bracket 108.

The FIG. 1 example embodiment includes an ultraviolet (UV) sterilizer unit 110 and a water reservoir tank 112. As described in greater detail below, alternative embodiments not having one or both of the UV water sterilizer unit 110 and the water reservoir tank 112 are contemplated by this invention.

Figure 4:
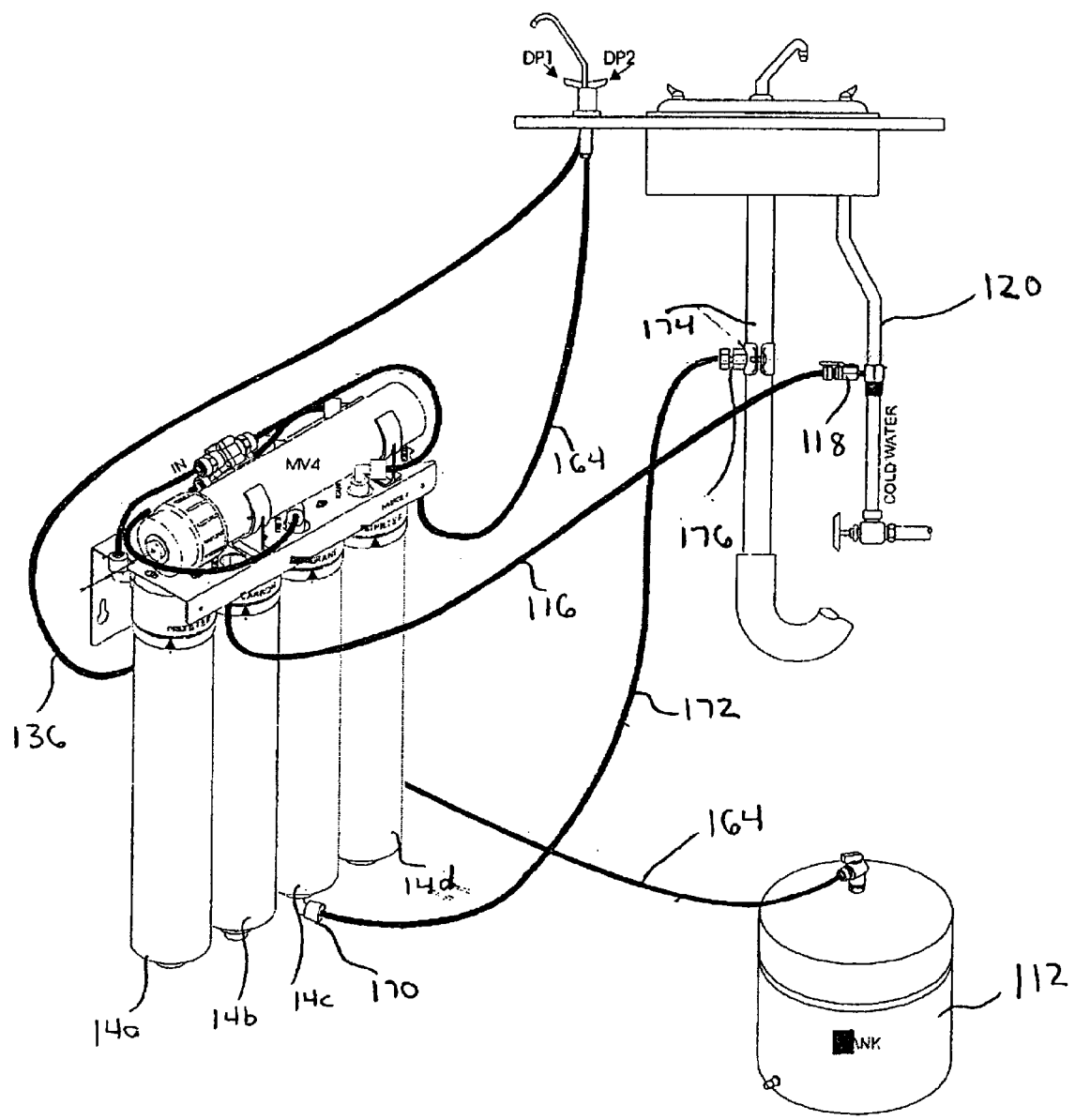
FIG. 4 illustrates the example water filter apparatus of FIG. 1 in its assembled form in a typical installed configuration.

FIG. 4 shows the example system of FIG. 1 assembled and installed, and will be referenced for describing the connections of the FIG. 1 system.

Referring to FIG. 1, the UV sterilizer unit 110 connects via a semi-circular bracket 114 to the main bracket 10. A first hose or water line 116 connects at one end to a water source such as, for example, the depicted diverter valve 118 shown in FIG. 4 connected in line with the tap water source line 120. The first hose or water line 116 connects at its other end to a first filter inlet hose attachment 122A mounted to the first canister mount diverter valve 12a valve's intake port (FIG. 2, item 30).

With continuing reference to FIGS. 1 and 4, a second hose or water line 124 connects at one end to a first filter outlet hose attachment 126A, which is mounted to the first canister mount diverter valve filter outflow port (FIG. 2, item 32). The second hose or water line 124 connects at its other end to the input port 128 of the optional first water flow regulator 104. A third hose or water line 130 connects from the output port 132 of the optional first water flow regulator 104 to a second filter inlet hose attachment 122B, which is mounted to the second canister mount diverter valve 12b valve intake port (FIG. 2, item 30). A T-outlet hose connection 134 is connected to the second canister mount diverter valve 12b filter outflow port (FIG. 2, item 32).

Referring to FIGS. 1 and 4, a fourth hose or water line 136 connects from a first output spigot 138 of the T-outlet 134 to an intermediate water tap DP1. The intermediate water tap DP1 provides the user with a source of water filtered through canisters 14a and 14b, which may be adequately purified for some uses. The intermediate water tap DP1 is optional and, if omitted, the T-outlet 134 and the fourth hose 136 can be omitted as well.

A fifth water line 140 connects from a second spigot 142 of the T-outlet 134 to a third inlet hose connection 122C which in turn is connected to the third canister mount diverter valve 12c valve intake port, (FIG. 2, item 130). A third outlet hose connection 126C, is connected to the third canister mount diverter valve 12c filter outflow port (FIG. 2, item 32).

A sixth hose or water line 144 connects between the third outlet hose connection 126C and the input port 146 of the optional second water flow regulator 106. A seventh hose or seventh water line 148 connects from the outlet port 150 of the second water flow regulator 106 to an input hose connection 152 of the UV sterilizer unit 110. An eighth hose or water line 154 connects from an output hose connection 156 of the UV sterilizer unit 110 to the first spigot 158 of the T-input 160 connected to the fourth canister mount diverter valve 12d valve intake port (FIG. 2, item 30). The second spigot 162 of the T-input 160 connects through a ninth hose or water line 164 to the water reservoir tank 112. A tenth hose or water line 168 connects at one end to a fourth outlet hose connection 126D connected to the fourth canister mount diverter valve 12d filter exit port (FIG. 2, item 32) and connects at its other end to the filter outlet tap DP2.

The water reservoir tank 112 is not essential for all applications of the invention, but is generally preferred to provide a pressurized feed of water, at an acceptable volume rate, through the remaining filter modules between it and the final tap. In the FIG. 1 example system this is the fourth canister mount diverter valve 12d and the fourth canister 14d. The need for the water reservoir tank 112 increases when any of the preceding filter canisters, i.e., 14a, 14b, and 14c in the FIG. 1 example, or another filter unit impose substantial flow restriction.

In the FIG. 1 example system the UV sterilizer unit 110 typically imposes substantial flow restriction, and therefore the water reservoir tank 112 is preferable. The water reservoir tank 112 compensates for such flow restrictions by having a flexible rubber water bag (not shown) within a rigid outer case. An air or inert gas, at approximately 5 to 7 pounds-per-square inch fills the space between the flexible bag and the outer case. During time intervals that the final tap DP2 is not opened, water flow from the UV sterilizer unit 110 fills the flexible bag. When the tap DP2 is opened the pressurized gas squeezes the flexible bag, forcing water into the fourth canister mount diverter valve 12d, through the fourth canister 12d, and out through the final tap DP2.

In an alternative embodiment (not shown) which omits the water reservoir tank 112, the seventh water line 148 connects to a single spigot inlet hose connection (not shown) connected to the fourth canister mount diverter valve 12d valve intake port (FIG. 2, item 30).

A flow of water through the example embodiment of FIGS. 1 and 4 will now be described. Since a filter canister 14 is installed in each of the canister mount diverter valves 12, each is assumed to be in the canister-installed mode described above. The description assumes that the intermediate filter tap DP1 and the final filter tap DP2 are both closed and that the water reservoir tank 112 is empty. This state will occur, for example, after the final water filter tap DP2 is closed after being held open long enough to empty the water reservoir tank 112.

The water flow begins by the first water line 116 receiving water from an outside, unfiltered source, such as the diverter valve 118 connected in line with the tap water source line 120. The unfiltered source water then enters the valve intake port (FIG. 2, item 30) of the first canister mount diverter valve 12a and flows through the passages 68 as described in reference to FIG. 2, into the first filter canister 14a, and exits through the first filter outlet hose attachment 126A. The water filtered by the first filter canister 14a then flows through the second water line 124, through the optional first regulator 104, and through the third water line into the second filter canister 14b by way of the second canister mount diverter valve 12b. After being filtered by the second filter canister 12b, the water flows into the optional T-outlet hose connection 134. Since the intermediate tap DP1 is closed, the water flows through the second spigot 142 of the T-outlet 134, through the fifth water line 140, into the third inlet hose connection 122C and into the third filter canister 12c. After being filtered by the filter canister 12c, the water flows through the third outlet hose connection 126A, through the optional second water flow regulator 106 and through the seventh water line 148 into the optional UV sterilization unit 110.

After passing through the UV sterilization unit 110 the water flows through the eighth hose or water line 154 into the first spigot 158 of the T-input 160. For this water flow description it is assumed that the water reservoir tank 112 is empty. Therefore, upon entering the first spigot 158 of the T-input 160 a portion of the water fill flow into the fourth canister 14d until that canister is filled, and the remainder will flow out through the second spigot 162, through the ninth water line 164 and into the water reservoir tank 112. The water flow will expand the flexible bag within the tank 112, overcoming the pressure of the gas surrounding the bag, until no further expansion is possible. This example assumes a five-gallon capacity for the water storage tank. After five gallons of water have flowed into the water reservoir tank 112 the water flow stops.

When the final tap DP2 is opened, the water storage tank 112 forces its stored water back through the ninth water line 164 and back into the second spigot 162 of the T-input 160. Due to water pressure of water from the UV sterilizer unit 110 entering the first spigot 158, the path of least resistance for water forced into the second spigot 162 is then into the fourth canister mount diverter valve 12*d* and into the fourth canister 14*d*. The pressure from the water reservoir tank 112 then forces the water through the filter content of the fourth canister 14*d*, out through the fourth outlet hose connection 126D, through the tenth water line 168, and out through the final tap DP2.

Assuming a flexible bag type water reservoir tank 112, an example final tap DP2 output water flow rate is in the range of approximately 0.5 to 0.75 gallons per minute, assuming no substantial restriction imposed by the DP2 tap. The flow continues at approximately this rate, although decreasing with time due to the decreasing pressure of the air surrounding the water bag in the reservoir tank 112 as the bag contracts, until the water reservoir tank is emptied. If the user continues to hold the final tap DP2 open after the water reservoir 112 is empty the DP2 output flow rate will be that set by the series resistance of all units preceding the fourth filter canister 14*d*. Referring to the FIG. 1 example system, the UV sterilizer unit 110 has a typical example flow rate of approximately 0.02 gallons per minute. A typical filter configuration, such as the example described below, may include a membrane/brine water filter as one of the filter canisters 14 installed in one of the diverter valves 12. A typical flow rate through a membrane/brine water filter of a size that would be typically used in a residential installation is also approximately 0.02 gallons per minute. Therefore, if the user holds the final tap DP2 open after the water reservoir tank 112 is empty the flow will typically be too low for practical use.

After the user closes the final output tap DP2 the water flow from the UV sterilizer unit 110 refills the water storage reservoir 112 by expanding its interior flexible bag against the surrounding gas pressure. As described above, the series resistance of the filter contents of the canisters preceding the water storage reservoir is significant. Assuming the water storage reservoir tank 112 to have a capacity of approximately three gallons, and using the example filter configuration describes below, an example approximate refill time, if the water reservoir tank is completely emptied, is 5 to 6 hours. The actual refill time depends, as will be understood by one of ordinary skill, on factors including water temperature, feed water pressure, the contamination level of the feed water, which affects the flow rate through, for example, a membrane/brine water filter, and back pressure from the storage tank 112 as it is filling.

An alternative embodiment (not shown) includes the water reservoir tank 112 as shown in FIG. 1, but omits the UV sterilizer unit 110. An example implementation of such an embodiment is a hose (not shown) connecting directly from the outlet hose connection 126C of the third canister mount diverter valve 12*c* to the first spigot 158 of the optional T-input 160.

A still further alternative embodiment (not shown) omits both the water reservoir tank 112 and the UV sterilizer unit 110. An example implementation is a hose (not shown) connecting from the output hose spigot 126C of the third diverter valve 12*c* to a single spigot input hose spigot (not shown) attached to the valve intake port 30 of the fourth canister mount diverter valve 12*d*.

FIG. 4 shows an example filter configuration for the FIG. 1 embodiment, which is the first filter canister 14*a* containing a prefilter of a specified type, the second filter canister 14*b* containing an activated carbon filter, the third filter canister 14*c* containing a membrane-brine water filter and the fourth filter canister 14*d* containing a post-filter. As shown in FIG. 4, the housing of the third filter canister 14*c* includes a waste spigot 170 and waste hose 172, the hose being connected to the sink drain 174 by a drain tap 176. Membrane-brine water filters are well-known in the art of water filters, as are the structural requirements for the waste spigot 170 and waste hose 172.

Referring to the filter canister 14*a* of the FIG. 4 example configuration, a typical flow rate through a prefilter of a size for a typical residential installation is approximately 0.15 gallons per minute. Referring to the filter canister 14*b* of the FIG. 4 example, a typical flow rate through an activated carbon filter for residential use is also approximately 0.15 gallons per minute. These rate are approximately eight times greater than the flow rate through the UV sterilizer 110 and the membrane/brine water filter installed as this example's filter canister 14*c*. This configuration provides a usable flow rate of water filter by canisters 14*a* and 14*b* out through the intermediate tap TP1 which, in the FIG. 4 example, does not have a water reservoir tank such as item 112.

The present invention has been described in terms of examples of the preferred embodiments of its various aspects. However, obvious additions, alterations, and substitutions within and to the preferred embodiments will likely become apparent to persons skilled in the art upon a reading the foregoing specification. Further, it will be understood that the specific structure, form and arrangement of parts depicted and described are for purposes of example only, and are not intended to limit the scope of structures and arrangements contemplated by this invention. Instead, the depicted examples are to assist persons of ordinary skill in understanding the principles, features and practical considerations of this invention and, based on the example and other descriptions herein, make and use it and any of its alternative embodiments that will be obvious upon reading this disclosure.

What is claimed is:

1. A water filter system, comprising:

a bracket;

a plurality of valve bodies, each mounted to said bracket, each having a canister connection structure, a valve input port, a filter feed port, a filter receiving port, a valve output port, a filter feed passage between said valve input port and said filter feed port, and a filter output passage between said filter receiving port and said valve output port;

a plurality of filter canisters, each having a housing, surrounding a water filter having an input and an output, said housing having a valve connection structure removably engaged with said canister connection structure of a corresponding one of said plurality of valve bodies, a canister inlet port opening at one end on an exterior surface of said housing and opening to said water filter input at another end, a canister outlet port opening at one end on an exterior surface of said housing and opening to said water filter output at another end, wherein said canister inlet port cooperates with said filter feed port of said corresponding one of said plurality of valve bodies and said canister outlet port cooperates with said filter outlet port of said one of said plurality of valve bodies;

a final water line connected at one end to said valve outlet port of a final of said valve bodies;

a final filter outlet spigot, having an on-off valve, connected to another end of said final water line;

a first T-connection water tap-off in said water path between said outlet port of said first valve body and said inlet port of said final valve body, having an inlet port, a first outlet port and a second outlet port;

an intermediate water line connected at one end to said second outlet port of said first T-connection water tap off; and an intermediate, user-accessible output spigot having an on-off valve, connected to another end of said intermediate water line, wherein a first of said valve bodies has its valve inlet port connected to an external water source, said valve output port of each other of said valve bodies is connected by a water passage to said valve input port of another of said valve bodies to establish a water path from said valve input port of said first valve body to said valve output port of said final valve body, said water path passing through said water filter of each of said plurality of filter canisters, and wherein said housing engagement structure of at least two of filter canisters' respective housing have common structure for interchangeable engagement with at least two of said valve bodies.

2. A water filter system according to claim 1, further comprising a UV sterilizer having an input port, a EN sterilization chamber, and an output port, wherein said input port is connected, by a portion of said water path, to said valve output port of one of said plurality of valve bodies and said output port is connected, by a portion of said water path, to said valve input port of another of said plurality of valve bodies.

3. A water filter system according to claim 1, further comprising:

a reservoir storage tank for storing a capacity of water and expelling the stored water at a predetermined pressure, the reservoir storage tank having an input/output port connected by a second T-connection in said water path, wherein said reservoir storage tank is filled by pressure from the external source pushing water through at least one filter canister's water filter when the on-off valve of the final filtered water output tap is closed, and said reservoir storage tank outputs, at said predetermined pressure, the stored water into the second T-connection when the on-off valve of the final filtered water output tap is opened.

4. A water filter system according to any of claim 1 or 3, wherein at least one of said valve bodies further comprises a bypass passage between said valve input port and said valve output port, and a valve member movable between a first position and a second position, the first position closing said bypass passage and the second position closing said filter feed passage and said filter flow receiving passage.

5. A water filter system according to any of claim 1 or 3, wherein at least one of said valve bodies further comprises a bypass passage between said valve input port and said valve output port, a valve member movable between a first position and a second position, and an actuator which moves said valve member to the first position in response to engaging with any of the filter canisters and moves said valve member to the second position in response to not engaging with any of the filter canisters.

6. A water filter system according to claim 1, further comprising:

a reservoir storage tank for storing a capacity of water and expelling the stored water at a predetermined pressure, the reservoir storage tank having an input/output port connected by a second T-connection to said water path, wherein said reservoir storage tank is filled by pressure from the external source pushing water through at least one filter canister's water filter when the on-off valve of the final filtered water output tap is closed, and said reservoir storage tank outputs, at said predetermined pressure, the stored water into the second T-connection when the on-off valve of the final filtered water output tap is opened, wherein the second T-connection is downstream of the first T-connection.

7. A water filter system according to claim 6 wherein a water flow resistance of the water path from the input port of the first valve body through the intermediate water spigot, when the water valve of the intermediate water spigot is open, is significantly lower than the water flow resistance from the input port of the first valve body to the input/output port of the water reservoir tank when said tank is filling.

8. A water filter system according to claim 3, further comprising a UV sterilizer having an input port, a UV sterilization chamber, and an output port, wherein said input port is connected, by a portion of said water path, to said valve output port of one of said plurality of valve bodies and said output port is connected, by a portion of said water path, to said valve input port of another of said plurality of valve bodies, and wherein the water path between said second T-connection and said valve input includes said UV sterilizer.

9. A water filter system, comprising a bracket;

a plurality of valve bodies, each mounted to said bracket, each having a canister connection structure, a valve input port, a filter feed port, a filter receiving port, a valve output port, a filter feed passage between said valve input port and said filter feed port, and a filter output passage between said filter receiving port and said valve output port;

a plurality of filter canisters, each having a housing surrounding a water filter having an input and an output, said housing having a valve connection structure removably engaged with said canister connection structure of a corresponding one of said plurality of valve bodies, a canister inlet port opening at one end on an exterior surface of said housing and opening to said water filter input at another end, a canister outlet port opening at one end on an exterior surface of said housing and opening to said water filter output at another end, wherein said canister inlet port cooperates with said filter feed port of said corresponding one of said plurality of valve bodies and said canister outlet port cooperates with said filter outlet port of said one of said plurality of valve bodies;

a final water line connected at one end to said valve outlet port of a final of said valve bodies;

a final filter outlet spigot, having an on-off valve, connected to another end of said final water line;

a first T-connection water tap-off in said water path between said outlet port of said first valve body and said inlet port of said final valve body, having an inlet port, a first outlet port and a second outlet port;

an intermediate water line connected at one end to said second outlet port of said first T-connection water tap off; and an intermediate, user-accessible output spigot having an on-off valve, connected to another end of said intermediate water line, wherein a first valve body from among said valve bodies has its valve inlet port connected to an external water source, said valve outlet port of said first valve body is connected to said valve inlet port of a second valve body from among said valve bodies, said valve outlet port of said second valve body is connected to said valve input port of a third valve body from among said valve bodies, said valve outlet port of said third valve body is connected to said valve inlet port of said final valve body, said housing engagement structure of at least two of filter canisters' respective housing have common structure for interchangeable engagement with at least two of said valve bodies.

10. A water filter system according to claim 9, further comprising:

a reservoir storage tank for storing a capacity of water and expelling the stored water at a predetermined pressure, the reservoir storage tank having an input/output port connected by a second T-connection water tap-off in said connection between said valve output port of said third valve body and said valve input port of said final valve body, wherein a first filter canister from among said filter canisters is engaged with said first vale body, a second filter canister from among said filter canisters is engaged with said second valve body, a third filter canister from among said filter canisters is engaged with said third valve body, and a final filter canister from among said filter canisters is engaged with said final valve body, and said reservoir storage tank is filled by pressure from the external source pushing water through said water filter of said first filter canister, said water filter of said second filter canister and said water filter of said third filter canister when the on-off valve of the final filtered water output tap is closed, and said reservoir storage tank outputs, at said predetermined pressure, the stored water into the second T-connection, into the valve input port of the final valve body, through the water filter of the final filter canister and out through the final filtered water tap when the on-off valve of the final filtered water output tap is opened.

11. A water filter system according to claim 10, further comprising a UV sterilizer having an input port, a UV sterilization chamber and an output port, connected in line within the connection between the valve output port of the second valve body and the valve input port of the third valve body.

12. A water filter system according to claim 11, wherein the flow resistance from the valve input port of the first valve body, through said water filter of said first filter canister and said water filter of said second filter canister, when the on-off valve of the intermediate filter spigot is opened is a first value, and the water flow resistance from the valve input port of the first valve body, through said water filter of said first filter canister, said water filter of said second filter canister, said water filter of said third filter canister and said UV sterilizer unit and into said input/output port of said water reservoir storage tank when said water reservoir storage tank is filling is a second value, and said second value substantially greater than said first value.

* * * * *